United States Patent
Dahlberg

(10) Patent No.: US 9,236,087 B1
(45) Date of Patent: Jan. 12, 2016

(54) OFF-TRACK PREDICTION USING AN ADAPTIVE THRESHOLD

(71) Applicant: Seagate Technology LLC, Cupertino, CA (US)

(72) Inventor: Eric J. Dahlberg, Farmington, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/539,138

(22) Filed: Nov. 12, 2014

(51) Int. Cl.
*G11B 21/02* (2006.01)

(52) U.S. Cl.
CPC .................................. *G11B 21/02* (2013.01)

(58) Field of Classification Search
None
See application file for complete search history.

(56) References Cited

U.S. PATENT DOCUMENTS

| | | | |
|---|---|---|---|
| 6,111,714 A * | 8/2000 | Ueda et al. | 360/60 |
| 6,496,315 B1 | 12/2002 | Ueda et al. | |
| 6,975,468 B1 * | 12/2005 | Melrose et al. | 360/60 |
| 7,027,255 B2 * | 4/2006 | Schmidt | 360/77.08 |
| 7,224,543 B1 | 5/2007 | Abrishamchian et al. | |
| 7,342,737 B2 | 3/2008 | DeRosa et al. | |
| 7,426,086 B2 * | 9/2008 | Tobari et al. | 360/53 |
| 8,315,006 B1 * | 11/2012 | Chahwan et al. | 360/75 |
| 8,625,215 B1 * | 1/2014 | Burd et al. | 360/31 |
| 2014/0168806 A1 | 6/2014 | Dhanda et al. | |

* cited by examiner

*Primary Examiner* — K. Wong
(74) *Attorney, Agent, or Firm* — Hollingsworth Davis, LLC

(57) ABSTRACT

A method for off track prediction comprises predicting a position error signal (PES) of a write head, comparing the predicted PES to an adaptive threshold, and preventing a write operation of the write head if the predicted PES exceeds the adaptive threshold. The adaptive threshold is a function of an on-cylinder limit, a smoothed standard deviation of an actual PES, and a smoothed standard deviation of the predicted PES.

20 Claims, 6 Drawing Sheets

Simulation Results

XpV is a lower sensitivity 2 tap filter
Newton is a high sensitivity 3 tap filter.

Total Off-Tracks in PES sample: 116

|  | Threshold | Protected | False Trigger |
|---|---|---|---|
| XpV: | 24.00 | 67 | 25 |
| Newton: | 24.00 | 81 | 69 |
| Newton(adaptive): | 24.00(mean) | 75 | 29 |

With the thresholds tuned to the average threshold of the adaptive method, we see that the adaptive method falls in between the low and high sensitivity filters with fixed thresholds

*FIG. 5*

Simulation Results

XpV is a lower sensitivity 2 tap filter
Newton is a high sensitivity 3 tap filter.

Total Off-Tracks in PES sample: 116

|  | Threshold | Protected | False Trigger |
|---|---|---|---|
| XpV: | 20.97 | 75 | 59 |
| Newton: | 27.00 | 75 | 46 |
| Newton(adaptive): | 24.00(mean) | 75 | 29 |

With the fixed thresholds tuned so that the number of protected SWOTs match, the adaptive method shows the lowest number of false positives.

*FIG. 6*

Simulation Results

XpV is a lower sensitivity 2 tap filter
Newton is a high sensitivity 3 tap filter.

Total Off-Tracks in PES sample: 116

```
                    Threshold      Protected    False Trigger
XpV:                23.84          67           29
Newton:             31.00          65           29
Newton(adaptive):   24.00(mean)    75           29
```

With the fixed thresholds tuned such that the false trigger rates are the same, the adaptive threshold method protects the against the most SWOTS.

*FIG. 7*

OFF-TRACK PREDICTION USING AN ADAPTIVE THRESHOLD

SUMMARY

A method for off track prediction of the present disclosure comprises predicting a position error signal (PES) of a write head, comparing the predicted PES to an adaptive threshold, and preventing a write operation of the write head if the predicted PES exceeds the adaptive threshold. The adaptive threshold is a function of an on-cylinder limit, a smoothed standard deviation of an actual PES, and a smoothed standard deviation of the predicted PES.

A disk drive of the present disclosure includes a controller in communication with a write head. The write head is configured to generate an actual position error signal (PES). The controller is configured to predict a PES of the write head and compare the predicted PES to an adaptive threshold that is a function of an on-cylinder limit, a smoothed standard deviation of the actual PES, and a smoothed standard deviation of the predicted PES. The controller is additionally configured to prevent a write operation of the write head if the predicted PES exceeds the adaptive threshold.

A system of the present disclosure includes a magnetic storage medium, a controller, and a magnetic write head that is configured to write to the magnetic storage medium in response to a command from the controller. The magnetic write head is also configured to generate an actual position error signal (PES). The controller is configured to predict a PES of the magnetic write head, to compare the predicted PES to an adaptive threshold, and to prevent a write operation of the magnetic write head if the predicted PES exceeds the adaptive threshold. The adaptive threshold is a function of an on-cylinder limit, a smoothed standard deviation of the actual PES, and a smoothed standard deviation of the predicted PES, The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

FIGS. 5-7 illustrate results of tests performed to compare adaptive threshold off track prediction of the present disclosure to other methods of off track prediction.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Hard disk drives (HDDs) are digital data storage devices which can enable users to store and retrieve large amounts of data in a fast and efficient manner. An HDD generally includes one or more magnetic recording disks which are mounted to a rotatable hub of a spindle motor and rotated at a high speed. An array of read/write heads is disposed adjacent surfaces of the disks to transfer data between the disks and a host. The read/write heads can be radially positioned over tracks on the disks by through use of a rotary actuator and a closed loop, digital servo system; microactuators may also be included in the positioning system. Once positioned, the read/write heads fly proximate surfaces of the disks upon air bearings to complete their assigned read or write operations at a specific location within a specific track on the disk.

During read or write operations, the HDD is vulnerable to shocks and vibrations. Such an event may result in the read/write head being moved away from a desired track. During a read operation, this may result in incorrect data being read from the disk. Another concern is shock and/or vibration during a write operation, which may result in an off-track write. An off-track write may cause existing data to be overwritten, potentially resulting in a permanent loss of data. As the density of data storage in HDDs increases, and the track pitch, e.g., the distance between adjacent tracks, decreases the potential for off-track writes becomes greater and greater. Accordingly, accurate control of a read/write head of an HDD and resistance to shock and/or vibration is a relevant design consideration.

Figure 1:
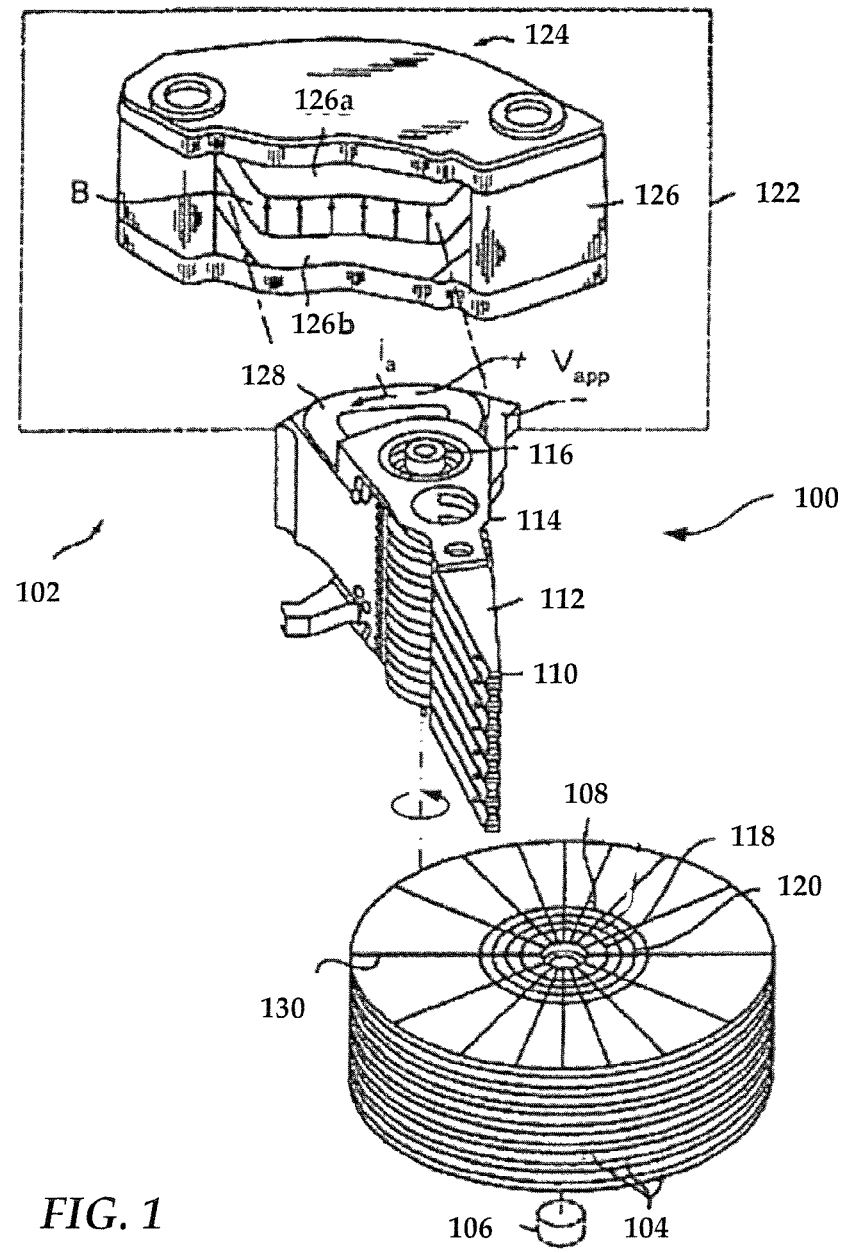
FIG. 1 is a diagram of an exemplary head disk assembly of a hard disk drive.

Referring to FIG. 1, an exemplary embodiment of a head disk assembly (HDA) 100 of an HDD illustrated. The HDA 100 includes an actuator 102 and disks 104 that can be rotated by a spindle motor 106. Data can be stored on the disks 104 in concentric circular data tracks 108. The data can be written and read from the disks 104 via magnetic transducers (read/write heads) 110 which are attached to flexible load beams 112 extending from actuator arms 114. The actuator arms 114 pivot about point 116 to move the load beams 112 in a radial direction over the storage surfaces of the disks 104, for example, from an initial track 118 towards a target track 120. At the target track 120, the magnetic transducers 110 can read from and/or write data on the disks 104. A motor, such as a voice coil motor (VCM) 122 controls the radial movement of the actuator arms 114 in proportion to an input actuator current $i_a$. Although the disks 104 are described as magnetic disks for purposes of illustration, the disks 104 may alternatively be optical disks or any other type of storage disk which can have data storage tracks defined on one or more storage surfaces. Similarly, the techniques may be applied to a variety of magnetic recording devices, including heat-assisted magnetic recording, shingled magnetic recording, bit-patterned media, etc.

The exemplary motor 122 can include a magnet 124 containing two plates 126a, 126b coupled together via a pair of sidewalls to form a flat toroidal shaped member 126. A wire coil 128 is disposed between the two plates 126a and 126b. The magnet 124 may generate a constant magnetic field B between the plates 126a and 126b. When the input actuator current $i_a$ is induced in the coil 128 disposed in the magnetic field B, a torque is produced on the actuator arms 114 resulting in radial motion of the arms 114 about pivot point 116. The polarity of the input actuator current $i_a$ determines the direction of radial motion of the actuator arms 114. The HDA 100 may additionally include microactuators (not shown) and relevant controls to provide fine positioning of the magnetic transducers 110 in addition to the coarse positioning provided by the actuator arms 114.

Figure 2:
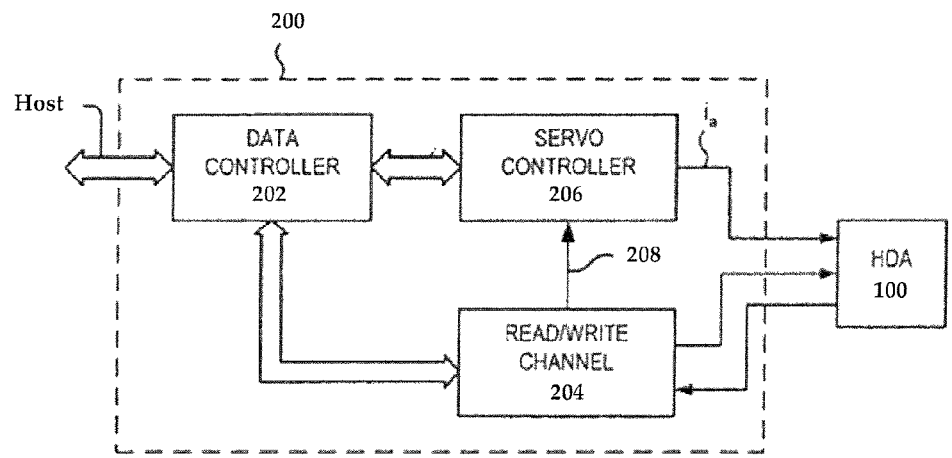
FIG. 2 is a block diagram of exemplary drive electronics of a hard disk drive.

Referring to FIG. 2, exemplary drive electronics 200 for the HDA 100 of FIG. 1, include a data controller 202, a read/write channel 204, and a servo controller 206. A data transfer initiated by a host (not shown) is submitted through the data controller 202, which formats the data into blocks with the appropriate header information and transfers the digital data to the read/write channel 204. The read/write channel 204 can operate in a conventional manner to convert data between the digital form used by the data controller 202 and the analog form used by the transducers 110 which is then provided to the HDA 100. The read/write channel 204 also provides servo positional information read from the HDA 100 to the servo controller 206 on line 208.

For example, the concentric data tracks 108 on the storage surface of a data disk 104 can be broken up and divided into segments by a multiplicity of regularly spaced apart embedded servo sectors 130 (FIG. 1). Each servo sector 130 can include transducer location information such as a track identification field and data block address, for identifying the track and data block, and burst fields to provide servo fine location information. The transducer location information can be used to detect the location of the transducers 110 in relation to that track and data block within the track. The transducer location information is induced into the transducers 110, converted from analog signals to digital data in the read/write channel 204, and transferred to the servo controller 206. The servo controller 206 can use the transducer location information for performing seek and tracking operations of the transducers 110 over the disk tracks 108.

Figure 3:
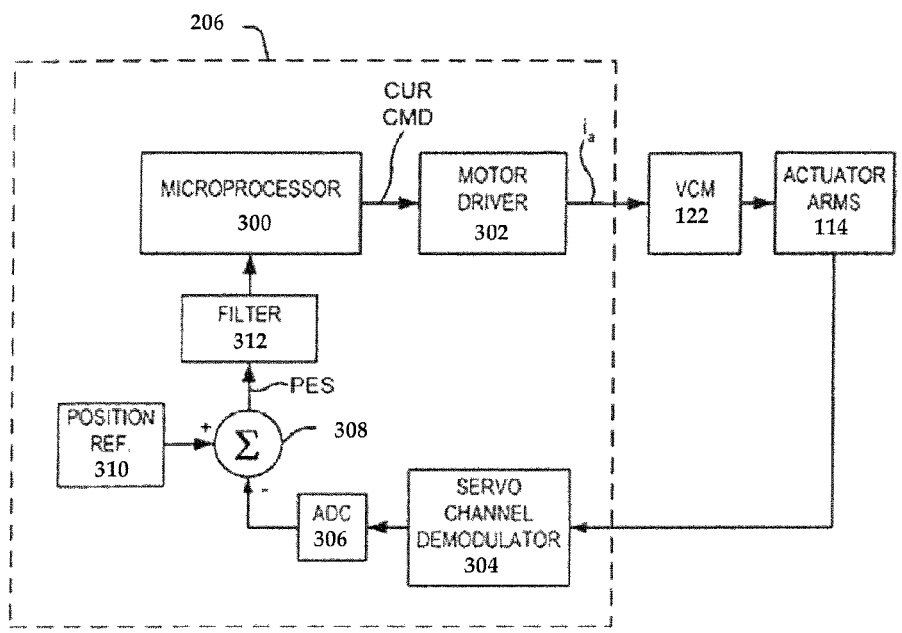
FIG. 3 is a block diagram of an exemplary servo controller of a hard disk drive that may be used to predict an error position signal of a transducer of a hard disk drive.

FIG. 3 is a block diagram of an exemplary servo controller 206. The servo controller 206 includes a controller/microprocessor 300 which is configured to generate a current command signal CUR CMD that is provided to a motor driver circuit 302. The motor driver circuit 302 converts the current command into an input actuator current signal $i_a$, which is provided to the voice coil motor VCM 122. As discussed above, the motor 122 moves the actuator arms 114 in response to the input actuator current signal $i_a$. A servo channel demodulator 304 generates a servo signal that is proportional to the position of the actuator arms 114. The servo signal is digitized by an analog to digital converter 306 and subtracted at a summing node 308 from a position reference signal generated by a position reference generator 310. Accordingly, the servo channel demodulator 304, the analog to digital converter 306, the position reference generator 310 and the summing node 308 form a position error sensor that is configured to generate a position error signal (PES) indicative of a difference between a desired position of the transducers 110 and an actual position of the transducers 110 relative to a track of the data storage disk 30.

The PES is then filtered by a filter 312, and the filtered position error signal is provided to the controller/microprocessor 300, which uses the filtered PES to control the current command, to thereby adjust the position of the transducers 110 relative to the target track 120. Filtering of the PES permits the controller/microprocessor 300 to make more accurate decisions as to the actual location of the transducers 110. That is, the filter predicts an actual PES based on a PES signal, which includes an error component. Thus, design of the filter 312 may have a significant effect on the performance of the servo controller 206.

The filter 312 may be a digital or analog filter. In particular, the filter 312 may be a finite impulse response (FIR) digital filter. An FIR filter may be implemented as a transversal filter, the design of which is known to those skilled in the art. The FIR filter coefficients may be determined by analyzing a series of position error data collected from an operating disk drive. An algorithm, such as a least squares algorithm, X plus V algorithm, Two Spoke algorithm, Newton algorithm, etc., may be used to find a filter that provides the best prediction for the data series.

The predicted PES may then be used by the controller/microprocessor 300 in off track prediction wherein the absolute value of the predicted PES is compared to: (a) a fixed threshold; or (b) a threshold that is a product of a preset scalar and on-cylinder limit. On-cylinder limit (OCLIM) is defined as the distance off the track center that the transducer is allowed to be positioned. Each track has a center and a transducer ideally is flown over the center of that track during a write operation. However, if the absolute value of the predicted PES exceeds the threshold, the write operation is deemed unsafe, and the controller/microprocessor 300 will prevent the data for the next sector from being written. While the described method for off track prediction has provided acceptable results, there is a desire for off track prediction that may reduce false positives, e.g., stopping a write operation when there is actually no need, and/or may increase the prediction sensitivity to off track writes.

Figure 4A:
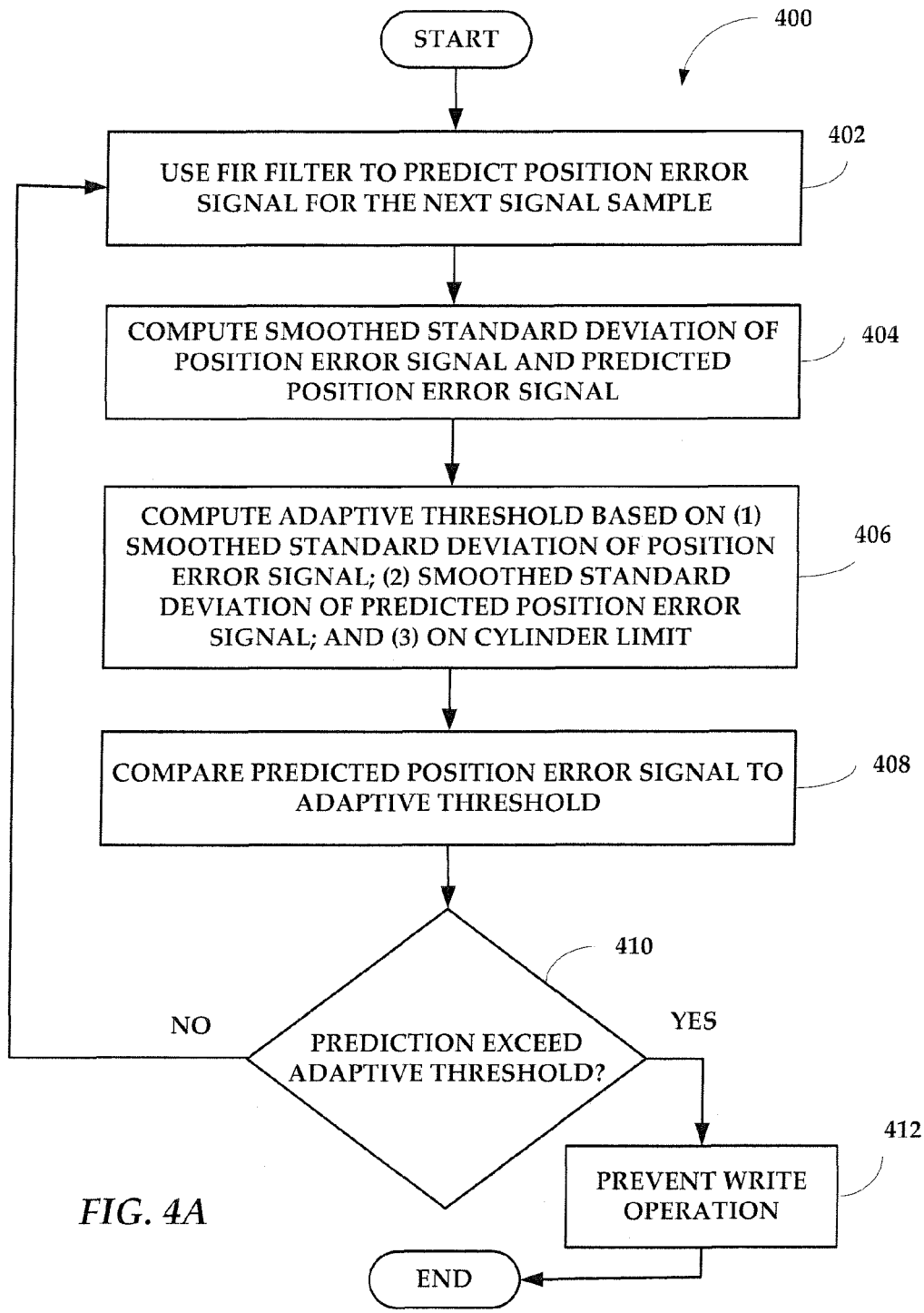
FIGS. 4A-4B are flowcharts illustrating off track prediction through use of an adaptive threshold according to various embodiments of the disclosure.

An off track prediction method 400 according to an embodiment of the disclosure is described below with reference to the flow chart of FIG. 4A. As illustrated, the method 400 includes: (1) utilizing a two or three tap FIR filter to predict the PES for the next signal sample (PES prediction is described above) 402; (2) computing the smoothed standard deviation of the PES and the predicted PES 404; (3) computing the adaptive threshold as a function of (a) OCLIM; (b) a smoothed standard deviation of the PES; and (c) a smoothed standard deviation of predicted PES 406; and (4) comparing the absolute value of the predicted PES to the adaptive threshold 408; (5) if the predicted PES exceeds the adaptive threshold (and the actuator is tracking at the write offset, e.g., the write head is in position to write) 410; (6) then, prevent a write operation, e.g., prevent a data write for the next sector) 412; or (7) return to predicting the position error signal for the next signal sample 402.

The adaptive threshold identified in step 408 is calculated by computing the smoothed standard deviation of PES and predicted PES for the current sample, k. ($\sigma_{Pred}(k)$ and $\sigma_{PES}(k)$ respectively). The adaptive threshold is defined as:

$$\text{Threshold}(k) = \frac{\sigma_{Pred}(k)}{\sigma_{PES}(k)} \cdot OCLIM \qquad \text{Eq. (1)}$$

The smoothed deviation ($\sigma_{Pred}(k)$ and $\sigma_{PES}(k)$) may be calculated as follows:

$$\text{Adaptation Rate:} = \frac{1}{N}, \qquad \text{Eq. (2)}$$

where $N$ is the window size in number of samples $x$:Signal to be sampled  Eq. (3)

Calculate the exponentially weighted running average for the current sample and the current sample squared:

$\bar{x}(0)=x(0)$  Eq. (4)

$\bar{x}_2(0)=x(0)^2$  Eq. (5)

$\bar{x}(k)=(1-\alpha)\cdot\bar{x}(k-1)+\alpha\cdot x(k)$  Eq. (6)

$\bar{x}_2(k)=(1-\alpha)\cdot\bar{x}_2(k-1)+\alpha\cdot x^2(k))$  Eq. (7)

Compute the exponentially weight variance:

$var_x(k)=\bar{x}_2(k)-\bar{x}(k)^2$  Eq. (8)

Compute the exponentially weighted standard deviation:

$$\sigma_x(k) = \sqrt{\text{var}_x(k)} \quad \text{Eq. (9)}$$

Figure 4B:
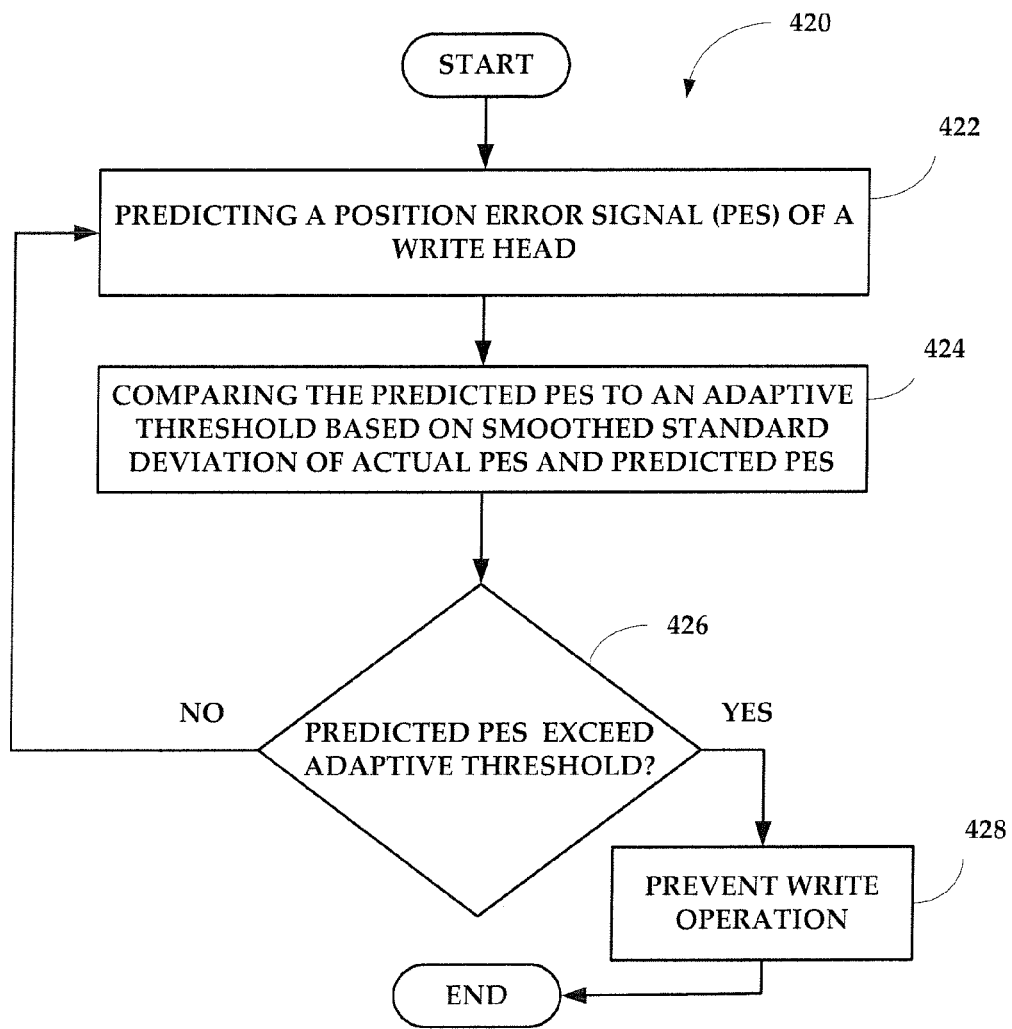

Another off track prediction method 420 according to an embodiment of the disclosure is described below with reference to the flow chart of FIG. 4B. As illustrated the method includes predicting a position error signal (PES) of a write head 422 and comparing the predicted PES to an adaptive threshold based on smoothed standard deviation of actual PES and predicted PES 424. If the predicted PES exceeds the adaptive threshold 426, then a write operation is prevented 428. If the predicted PES does not exceed the adaptive threshold 426, the method repeats.

Various off track prediction simulations were performed to compare the results of the adaptive threshold method, identified within the figures as Newton(adaptive), to XpV and standard Newton methods. The results of the simulations are provided in FIGS. 5-7. Each of the methods was tested on the same PES data in which 116 off track PES events occurred. The columns of FIGS. 5-7 reflect the performance of each of the methods for this common PES data. The performances of the methods are broken out in three ways: (1) by the threshold, see FIG. 5; (2) by the number of protected events, see FIG. 6; and (3) by the number of false trigger counts, see FIG. 7. Note that "protected events" refers to the number of off-track PES events out of 116 in which a write was prevented with one of the off-track prediction methods. Further, "false trigger counts" refers to a condition in which a false trigger occurs and the next servo sector is set unsafe as a result.

FIG. 5 illustrates the results of the comparison when the thresholds of the XpV and Newton method were tuned to the average threshold of the Newton (adaptive) method. As can be seen, the adaptive method hills in between the low and high sensitivity filters with fixed thresholds. FIG. 6 illustrates the results of the comparison when the fixed thresholds of the XpV method and the Newton method are tuned so that the number of protected single wedge off track (SWOT) events match those identified under the adaptive method. As shown, the adaptive method shows the lowest number of false positives. FIG. 7 illustrates the results of the comparison when the fixed thresholds of the XpV method and the Newton method are tuned such that false trigger rates are the same as those provided by the adaptive method. As shown the adaptive method, protects against the most SWOTs.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. A method comprising:
  predicting a position error signal (PES) of a write head;
  comparing the predicted PES to an adaptive threshold which is a function of an on-cylinder limit, a smoothed standard deviation of an actual PES, and a smoothed standard deviation of the predicted PES; and
  preventing a write operation of the write head if the predicted PES exceeds the adaptive threshold.

2. The method of claim 1, further comprising utilizing a finite impulse response filter to predict the PES of the write head.

3. The method of claim 2, wherein the finite impulse response filter comprises a two tap filter or a three tap filter.

4. The method of claim 1, wherein the adaptive threshold is calculated according to the equation: adaptive threshold=((smoothed standard deviation of the predicted PES)/(smoothed standard deviation of actual PES))× on-cylinder limit.

5. The method of claim 1, further comprising determining if the write head is operating in a write offset mode.

6. The method of claim 1, wherein preventing the write operation comprises preventing the writing of data to a sector.

7. The method of claim 1, further comprising confirming that an actuator of the write head is tracking at a write offset.

8. The method of claim 1, wherein the smoothed standard deviations of the actual PES and the predicted PES are obtained based on an exponentially weighted running average of a current PES sample and the current PES sample squared.

9. A disk drive, comprising:
  a controller configured to communicate with a write head, the write head configured to generate an actual position error signal (PES), the controller configured to:
    predict a PES of the write head;
    compare the predicted PES to an adaptive threshold which is a function of an on-cylinder limit, a smoothed standard deviation of the actual PES, and a smoothed standard deviation of the predicted PES; and
    prevent a write operation of the write head if the predicted PES exceeds the adaptive threshold.

10. The disk drive of claim 9, wherein a finite impulse response filter signal provided to the controller is used to predict the PES of the write head.

11. The disk drive of claim 10, wherein the finite impulse response filter comprises a two tap filter or a three tap filter.

12. The disk drive of claim 9, wherein the adaptive threshold is calculated according to the equation: adaptive threshold=((smoothed standard deviation of the predicted PES)/(smoothed standard deviation of actual PES))× on-cylinder limit.

13. The disk drive of claim 9, the controller additionally configured to determine if the write head is operating in a write offset mode.

14. The disk drive of claim 9, wherein prevention of the write operation comprises prevention of data being written to a sector.

15. The disk drive of claim 9, wherein the controller is additionally configured to determine if an actuator of the write head is tracking at a write offset.

16. The disk drive of claim 9, wherein the smoothed standard deviations of the actual PES and the predicted PES are obtained based on an exponentially weighted running average of a current PES sample and the current PES sample squared.

17. A system, comprising:
- a magnetic storage medium;
- a controller; and
- a magnetic write head configured to write to the magnetic storage medium in response to a command from the controller, the magnetic write head generating an actual position error sample (PES),
- wherein the controller is configured to predict a PES of the magnetic write head; to compare the predicted PES to an adaptive threshold which is a function of an on-cylinder limit, a smoothed standard deviation of the actual PES, and a smoothed standard deviation of the predicted PES; and to prevent a write operation of the magnetic write head if the predicted PES exceeds the adaptive threshold.

18. The system of claim 17, wherein a finite impulse response filter signal provided to the controller is used to predict the PES of the write head.

19. The system of claim 17, wherein the adaptive threshold is calculated according to the equation: adaptive threshold=((smoothed standard deviation of the predicted PES)/(smoothed standard deviation of actual PES))× on-cylinder limit.

20. The system of claim 17, wherein the smoothed standard deviations of the actual PES and the predicted PES are obtained based on an exponentially weighted running average of a current PES sample and the current PES sample squared.

* * * * *